United States Patent [19]

Rosa

[11] Patent Number: 5,068,774

[45] Date of Patent: Nov. 26, 1991

[54] 24-PULSE HEXAGON-TYPE AC/DC STATIC CONVERTER

[75] Inventor: John Rosa, Penn Hills, Pa.

[73] Assignee: Westinghouse Electric Corp., Pittsburgh, Pa.

[21] Appl. No.: 620,809

[22] Filed: Dec. 3, 1990

Related U.S. Application Data

[63] Continuation-in-part of Ser. No. 589,243, Sep. 28, 1990, abandoned.

[51] Int. Cl.[5] .................... H02M 7/155; H02M 7/162
[52] U.S. Cl. ............................................. 363/3; 363/5; 363/64; 363/129
[58] Field of Search ........................................ 363/2–7, 363/64, 126, 129

[56] References Cited

U.S. PATENT DOCUMENTS

| | | | |
|---|---|---|---|
| 4,255,784 | 3/1981 | Rosa | 363/125 |
| 4,366,532 | 12/1982 | Rosa et al. | 363/69 |
| 4,482,945 | 11/1984 | Wolf et al. | 363/129 |
| 4,493,016 | 1/1985 | Cham et al. | 363/12 B |
| 4,683,527 | 7/1987 | Rosa | 363/5 |

FOREIGN PATENT DOCUMENTS

| | | | |
|---|---|---|---|
| 1203380 | 10/1965 | Fed. Rep. of Germany | 363/6 |
| 801204 | 1/1981 | U.S.S.R. | 363/3 |
| 1035755 | 8/1983 | U.S.S.R. | 363/3 |

Primary Examiner—William H. Beha, Jr.
Attorney, Agent, or Firm—M. J. Moran

[57] ABSTRACT

An AC/DC or DC/AC converter includes a single hexagon transformer with each side connected to opposite polarity DC terminals through two pairs of SCR devices gated in sequence synchronously with the frequency of the AC lines, gating in a pair lagging gating of the next SCR device in the adjoining pair, to create a 24-pulse output, while minimizing AC line harmonic contents, especially the 11th and 13th harmonics.

4 Claims, 7 Drawing Sheets

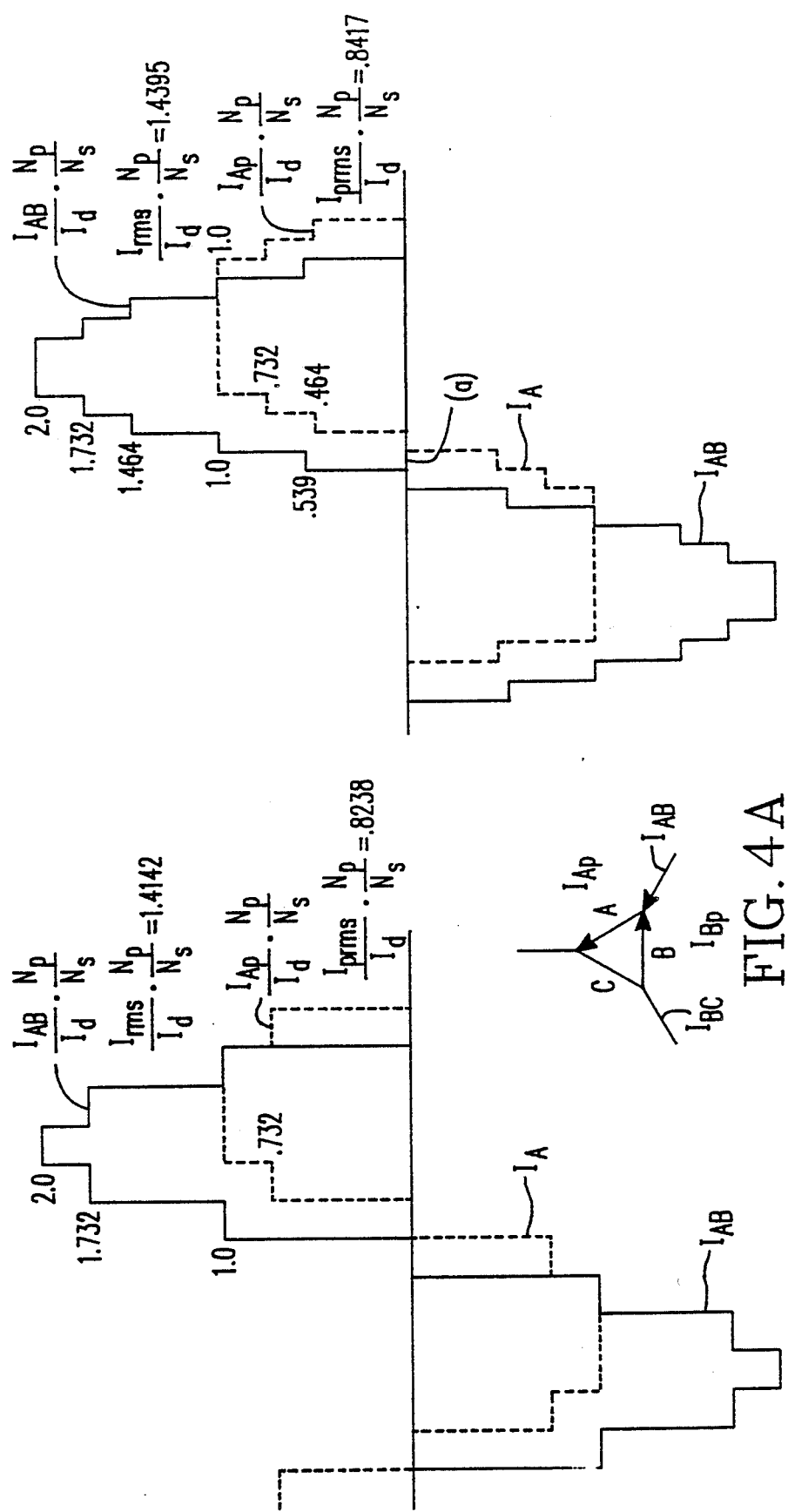

24-PULSE HEXAGON-TYPE AC/DC STATIC CONVERTER

CROSS-REFERENCE TO RELATED APPLICATION

This application is a continuation-in-part of copending U.S. Pat. application Ser. No. 07/589,243, filed Sept. 28, 1990.

BACKGROUND OF THE INVENTION

The invention relates to AC/DC or DC/AC converters of the hexagon type. A 12-pulse conversion circuit of the hexagon type has been described in U.S. Pat. No. 4,255,784. The main attribute of the Hexagon circuit is that, with a single transformer it can meet the stringent requirements regarding the harmonic contents of the AC input currents drawn by the converter from the AC supply lines. In particular, as opposed to more conventional static converter circuits, there is no need for more filtering circuits.

The performance of the Hexago circuit regarding the harmonics rests upon the effective inductances which determine the commutation overlap angle of its semiconductor switches. The required commutation inductances can be incorporated into the Hexagon transformer in the form of leakage inductances, or by providing external inductances in the form of "outboard" inductors. The rating of the converter, as well as the size, weight and efficiency come into consideration. U.S. Pat. No. 4,255,784 shows how to reduce the AC line current harmonics by "stretching" the commutation overlaps with the help of relatively small commutation inductances. Outboard inductor schemes for the same purpose have been described, one in U.S. Pat. No. 4,366,532, another in U.S. Pat. No. 4,683,527.

However, with the afore-stated designs which have been applied to a 12-pulse converter, the dominant AC line current harmonics have been reduced from 9% (as typical for a conventional 12-pulse converter) to less than 3%, but not any further.

Further reduction of the AC line harmonics is possible by using a converter having an increased pulse number. See 1) B..R Pelly, Thyristor Phase-Controlled Converters and Cycloconverters, John Wiley & Sons, Inc. N.Y., 1971; and 2) J. Schaeffer, Rectifier Circuits, Theory and Design, John Wiley & Sons, Inc. N.Y., 1965. A natural approach consists in using with a 12-pulse converter the same technique as going from a 6-pulse to a 12-pulse converter. Then, the best form of a 12-pulse converter will be used to build a 24-pulse converter. This leads to taking the Hexagon as the first choice in minimizing the harmonics. Two converters will, then, be combined in series or in parallel, so as to obtain a 24-pulse system, thereby cancelling the dominant 11th and 13th harmonics. However, the much lower 23rd and 25th harmonics become the dominant harmonics in such a scheme. There is also a serious drawback, since this solution calls for two three-phase transformers.

The purpose of the present invention is to design a single-transformer 24-pulse converter having much reduced AC line current harmonics.

The afore-stated U.S. Patents are hereby incorporated-by-reference.

SUMMARY OF THE INVENTION

The present invention resides in a staticcontrolled converter including a single hexagon transformer comprising a three-phase AC current winding and six serially connected windings respectively defining the six sides of the hexagon, each side being connected to opposite polarity DC terminals via respective staticcontrolled switches, twelve pairs of said switches being symmetrically disposed, each pair being associated to a common side of the hexagon and forming a closed-loop with the opposite polarity terminals while having a common junction with the corresponding one of said windings; means being provided for sequentially controlling the switches of even rank in the succession of said pairs which are connected to one DC terminal and the switches of uneven rank in said succession which are connected to the other DC terminal, the gating sequence of said switches being synchronous with the frequency of the three-phase current; gating of a switch in a pair lagging gating of the next switch in the adjoining pair within the said gating sequence by a predetermined delay angle, thereby to create a 24-pulse output voltage, while minimizing the AC line harmonic contents.

BRIEF DESCRIPTION OF THE DRAWINGS

FIG. 4 illustrates the AC line current and the primary current in the case of FIG. 3A, while FIG. 5 relates to the same currents in the FIG. 3C situation;

DETAILED DESCRIPTION OF THE INVENTION

The present invention relates to an AC to DC static - controlled converter having very low AC line current distortion. It resides in using a single transformer of the hexagon-type adapted for 24-pulse operation. As described in the prior art, harmonic reduction is obtained in relation to a 6-pulse converter by doubling the number of static switches to achieve a 12-pulse system. This has been done by either using two transformers, or a single transformer with twin secondaries, to place two 6-pulse systems in series or in parallel, or by using a single transformer of the hexagon type with 12 switches distributed around its six windings. U.S. Pat. No.

4,849,870 is characteristic of the first solution, whereas, U.S. Pat. Nos. 4,255,784 and 4,683,527 illustrate the second solution.

With the same line of thought, a 24-pulse system would have less harmonics than the 12-pulse system. The problem is how to extend the latter to a 24-pulse system. Indeed, this will require twice the number of static switches. From there, one approach to be taken is, as shown in the afore-mentioned U.S. Pat. No. 4,849,870, to use four 6-pulse systems or two 12-pulse systems, properly phase shifted, but this would require four transformers in the first instance, and two transformers in the second. With the same philosophy, two 12-pulse and hexagon-type may be used in series, or in parallel in order to achieve a 24-pulse system. This solution also requires two phase shifting transformers. In the latter instance, as shown by Fourier analysis of the AC line current waveforms, a mere doubling from 12 to 24 pulses will lead, for harmonics H=1 to 25, to the following theoretical harmonic content as percent of the fundamental:

TABLE I

| H | Single Hexagon and 12-Pulse | Double Hexagon and 24-Pulse |
|---|---|---|
| 1 | 100 | 100 |
| 3 | 0 | 0 |
| 5 | 0 | 0 |
| 7 | 0 | 0 |
| 9 | 0 | 0 |
| 11 | 9.09 | 0 |
| 13 | 7.69 | 0 |
| 15 | 0 | 0 |
| 17 | 0 | 0 |
| 19 | 0 | 0 |
| 21 | 0 | 0 |
| 23 | 4.35 | 4.35 |
| 25 | 4.0 | 4.0 |

The ideal harmonic content of the 12-pulse hexagon circuit (30° phase shift) includes zero harmonics for $H=3K$, $6K+1$ and $6K-1$ (where $K=1, 2, ...$) the remaining harmonics having amplitudes of 100/H%. In the 24-pulse double-hexagon circuit (15° phase shift) the 11th and 13th are cancelled due to the symmetry of the two adjoining halves. However, the 23rd and 25th harmonics remain unaffected.

Figure 1:
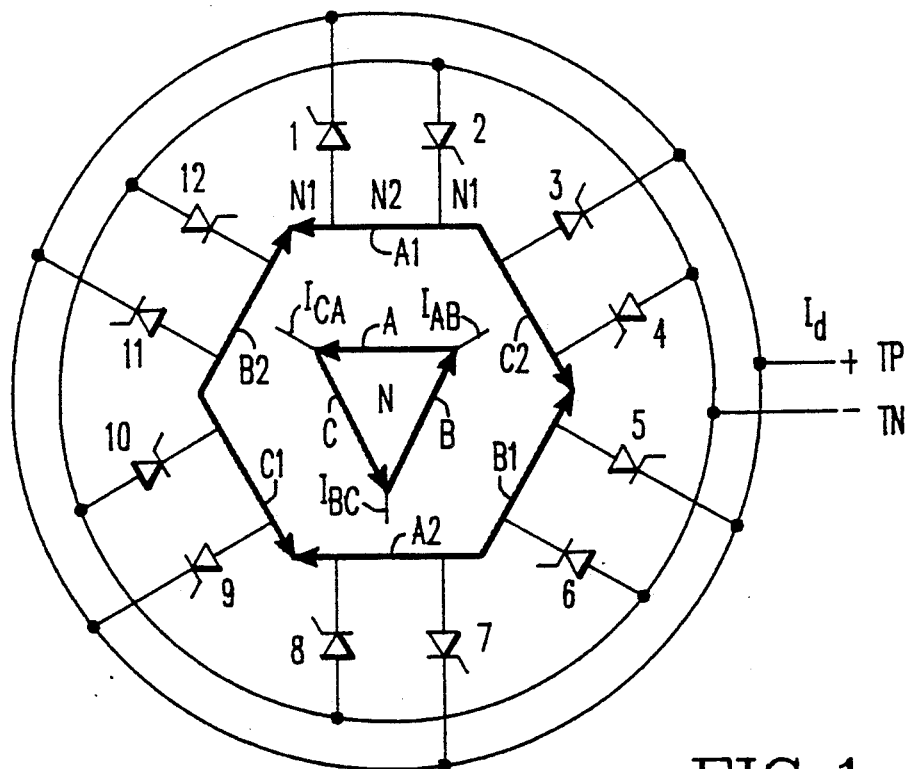
FIG. 1 a 12-pulse Hexagon converter of the prior art.
Figure 2:
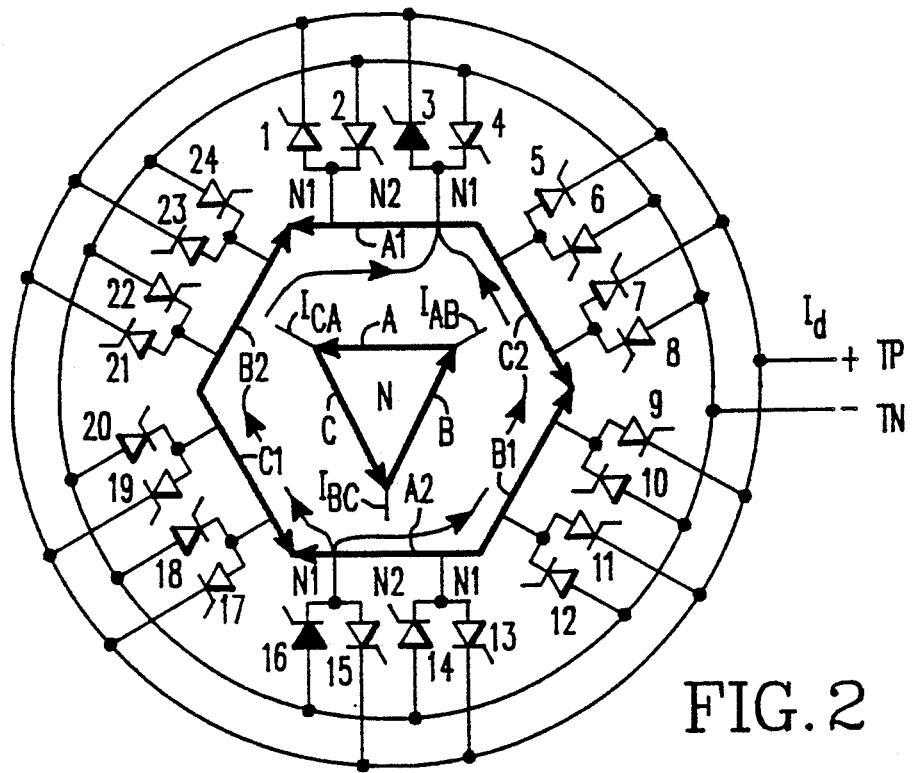
FIG. 2 the 24-pulse and Hexagontype converter circuit according to the present invention.

According to the present invention, a single hexagon-type transformer is intended for a 24-pulse system. FIG. 1 shows the original 12-thyristor and 12-pulse hexagon-type system according to U.S. Pat. Nos. 4,255,784 and 4,683,527. FIG. 2 shows the 24-thyristor and 24-pulse hexagon-type system according to the present invention. With the latter, the thyristors are used by pairs, one thyristor in each pair being associated with one polarity terminal (one positive-going and one negative-going), and each pair of thyristors being connected, at one of two symmetrically disposed junctions, to a hexagon winding (whereas the prior art uses a single thyristor associated to each of such separate and symmetrically disposed junctions on the hexagon winding). Therefore, the thyristor polarities are altering upon each of the junctions and from each junction to the next. Two sets of thyristors (positive-going and negative going) are, thus, imbricated one in the other, each set for a corresponding polarity terminal. The firing sequence, chosen in the 12-pulse type to follow the successive order of the thyristors around the hexagon, becomes here for each successive thyristors the odd or the even number of alternating sets, depending upon the polarity side.

Referring to FIG. 1, which is prior art, to the hexagon transformer (delta primary winding of phases A, B, C and six secondary windings A1, A2, B1, B2, C1, C2) are associated 12 thyristors 1 to 12, the even numbered ones being connected to the negative DC terminal, the odd numbered ones to the positive DC terminal. These are also connected to junction points of the secondary windings of which the junction-to-virtual neutral voltages are at 30° phase shift to one another (thyristors 1 and 2 with A1, 7 and 8 with A2, etc...), the junction points of a common winding being at N1 turns from the end of the winding and having N2 turns therebetween. This has been described in U.S. Pat. No. 4,683,527.

Referring now to FIG. 2, the system includes 12 pairs of thyristors, each pair being connected in series across the DC terminals, thyristors 1, 3, 5, ... with the positive terminal, thyristors 2, 4, 6, ... with the negative terminal, the junction points being connected to an associated hexagon winding (thyristors 1, 2 and 3, 4 for winding A1, opposite on the hexagon to thyristors 13, 14 and 15, 16 for winding A2) and at 30° from one another in their order of succession.

Table II herebelow shows, in the first column, the firing sequence for a 12-pulse hexagon converter and, in the second column, the control sequence for a 24-thyristor converter:

TABLE II

| Thyristor Sequence | |
|---|---|
| 12-Pulse Hexagon | 24-Pulse Hexagon |
| 1, 8 | 1, 14 |
| 3, 8 | 3, 14 |
| 3, 10 | 3, 16 |
| 5, 10 | 5, 16 |
| 5, 12 | 5, 18 |
| 7, 8 | 7, 18 |
| 7, 1 | 7, 20 |
| 9, 1 | 9, 20 |
| 9, 3 | 9, 22 |
| 11, 3 ... | 11, 22 ... |

Figure 3A:
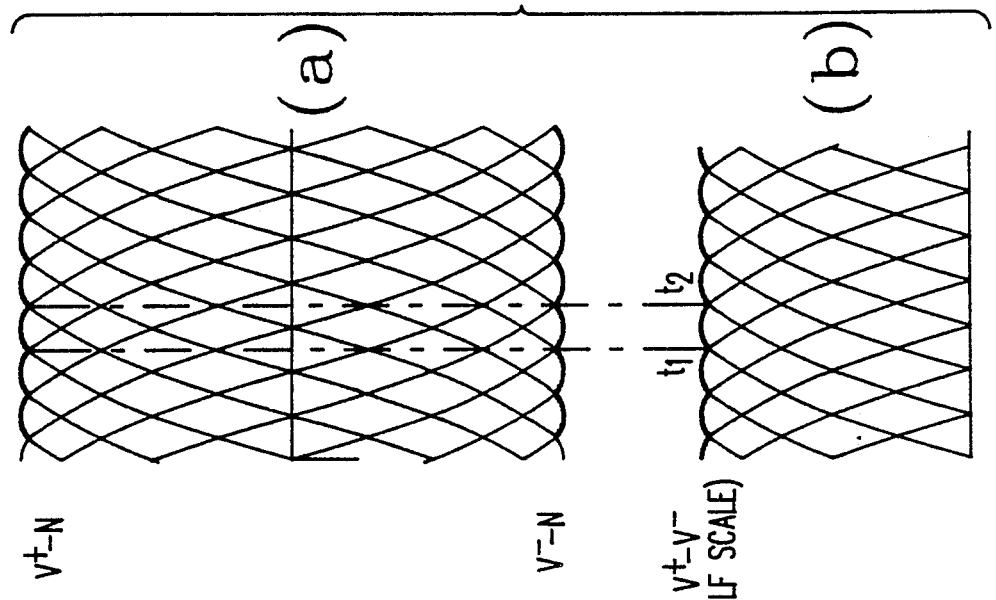
FIG. 3A illustrates with curve (a) the bus-to-neutral output voltages and with curve (b) the bus-to-bus output voltages for a 12-pulse hexagon-type converter.

With the 12-pulse hexagon system of FIG. 1, the symmetrically tapped secondary windings provide twelve AC voltages with respect to a virtual neutral N point located at the geometrical center of the hexagon. The twelve voltages are vectors displaced at 30°. Six "positive-going" thyristors provide a positive DC potential (V+, −N) on the positive terminal TP with respect to the virtual neutral, and six "negative-going" thyristors provide a negative DC potential (V−, −N) on the negative terminal TN. Curves (a) of FIG. 3A show (with all the thyristors being gated at the natural commutation point for maximum output voltage) the voltages derived by the thyristors on the positive (above) and negative (below) sides. Curve (b) of FIG. 3A shows that two 30° displaced 6-pulse ripples are resulting here in a 12-pulse ripple for the output voltage.

Figure 3B:
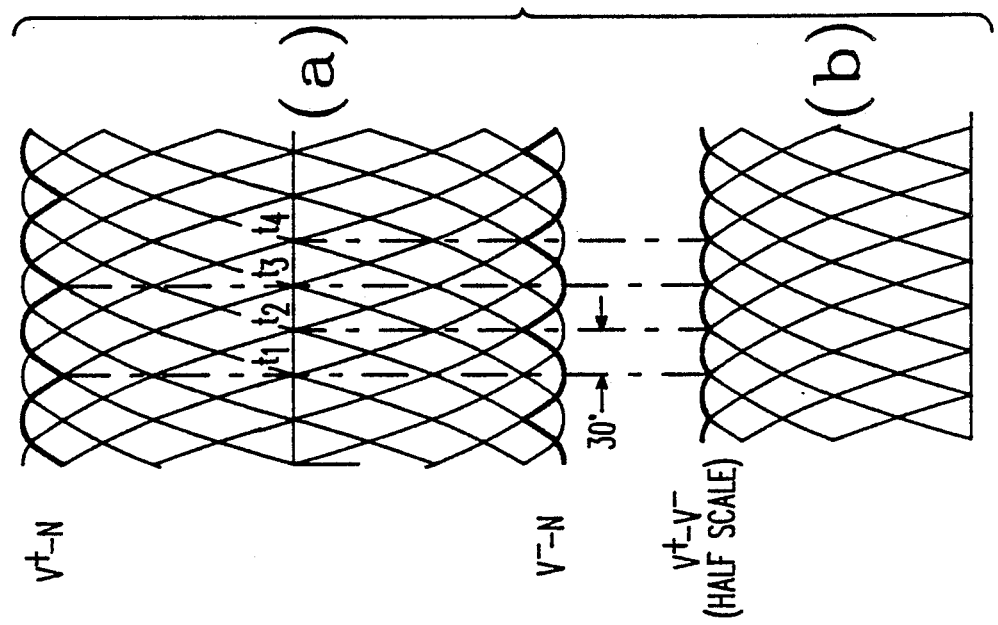
FIG. 3B shows the same output voltages for a mere thyristor doubling with the hexagon of FIG. 3A.

FIG. 3B shows what happens with a hexagon in which twelve "positive-going" thyristors and twelve "negative-going" thyristors (gated at the natural commutation point for maximum output voltage) are used to provide positive DC potential (V+, −N) and negative DC potential (V−, −N), respectively. Again, all the thyristors are gated at the neutral commutation point for maximum output voltage. Both the positive and the negative terminal potentials now have 12-pulse ripples, but they are without displacement, so that a mere 12- pulse ripple for the output voltage is the outcome. Thus, merely gating 24 thyristors in sequence order does not provide the desired 24-pulse output.

Figure 3C:
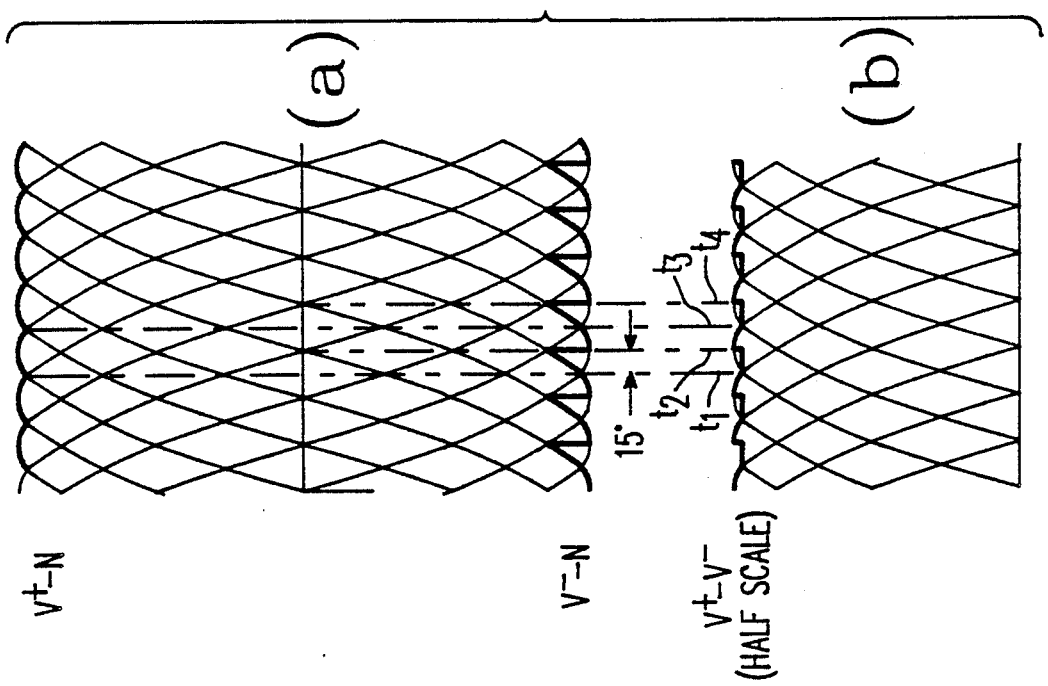
FIG. 3C shows the same output voltages for the 24-pulse hexagon-type converter according to the present invention, the distinction with FIG. 3B being a specific gating phase shift of 15° for the thyristors of opposite polarities.
Figure 6:
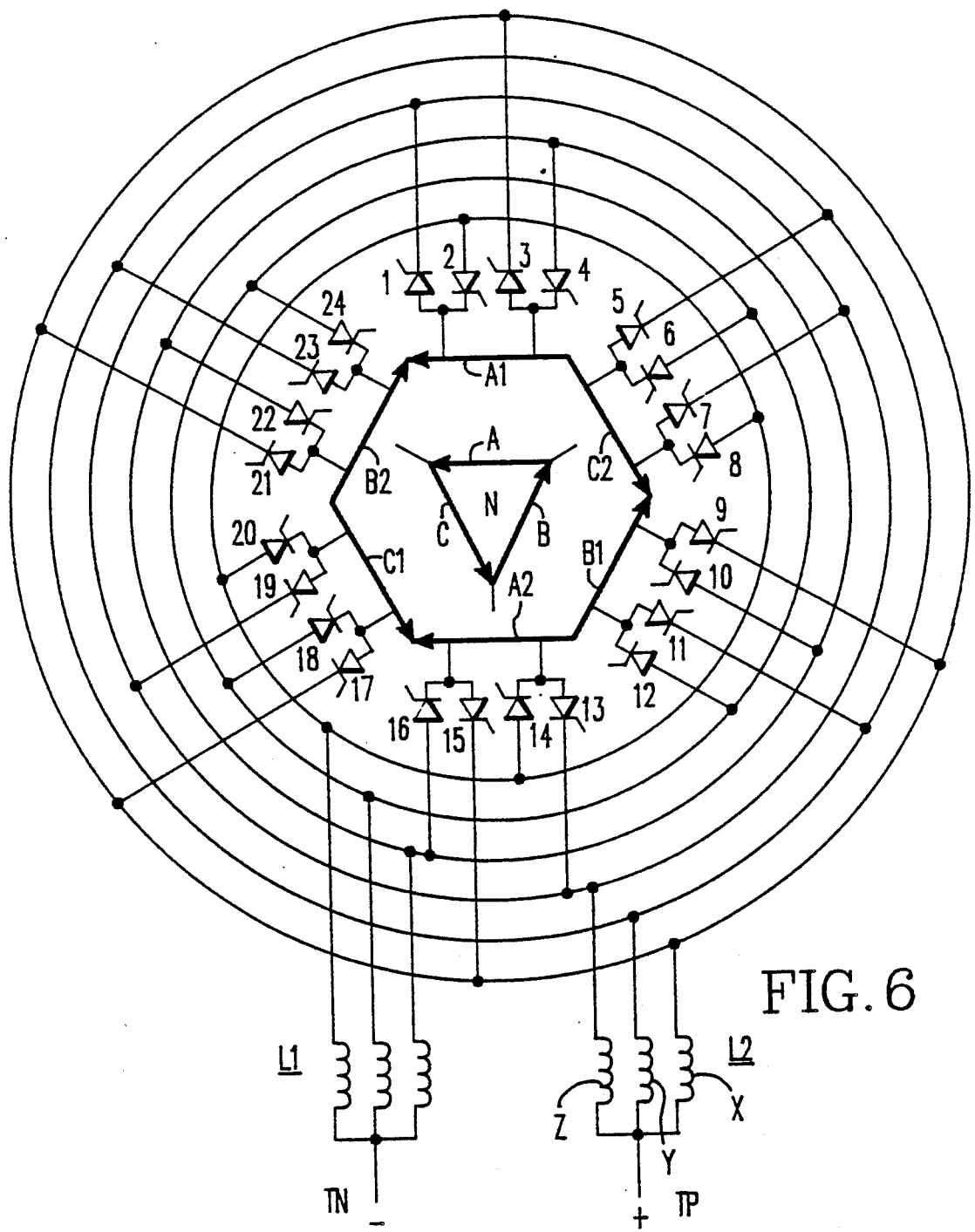
FIG. 6 shows the 24-pulse Hexagon converter according to the present invention embodying outboard 3-winding commutating inductors such as described in U.S. Pat. No. 4,683,527.

According to the present invention, a 15° "delay" with respect to the "positive-going" thyristors applied upon gating the "negative-going" thyristors, or vice versa. FIG. 3C shows with curves: 1) gating the "negative-going" set of alternating thyristors at 15° delay (curve (a)); and 2) the resulting 24-pulse effect (curve (b)). Gating both sets of thyristors (without delay) would evidently fail to bring about the result. It is also understood that gating with more, or less, than 15° would still lead to a 24-pulse effect. However, the goal to be achieved with the harmonics would be decreased by the amount of the discrepancy from a true 15° gating shift.

Having obtained with this approach a 24-pulse system, Fourier analysis of the AC line current waveforms due to the 24-pulse according to the invention reveals that the harmonic contents in percent of the fundamental represent yields a serious improvement for the 11th and 13th harmonics when compared with the original 12-pulse hexagon type circuit, as follows:

TABLE III

| H | Single Hexagon and 12-Pulse | Double Hexagon and 24-Pulse |
|---|---|---|
| 1 | 100 | 100 |
| 3 | 0 | 0 |
| 5 | 0 | 0 |
| 7 | 0 | 0 |
| 9 | 0 | 0 |
| 11 | 9.09 | 1.19 |
| 13 | 7.69 | 1.00 |
| 15 | 0 | 0 |
| 19 | 0 | 0 |
| 21 | 0 | 0 |
| 23 | 4.35 | 4.34 |
| 25 | 4.0 | 3.99 |

Referring to FIG. 4 which relates to the 12-pulse Hexagon system, the AC line current $I_{AB}$ (associated the A and the B windings of a delta-connected primary winding), shown in FIG. 4A, extends between two maximum values shown at a scale of 2.0 on each alternance, passing by two intermediate levels of 1.6 and 1.0 before reaching, or leaving, the zero level, each level being separated from the next by 30 electrical degrees, as demonstrated by the spatial relationship of the thyristor junction points on the secondary windings (A1, B1, C1, A2, B2, ...) of the hexagon. AC line current $I_{AC} = (I_A - I_B)$ is shown in solid line. One of the concurring primary winding AC currents, $I_A$ for winding A of FIG. 4A, is shown in dotted line on FIG. 4 (the other one, $I_B$, is not shown, but is in fact merely shifted by 120°). The maximum current amplitude is given per-unit as 1.0 and the actual current exhibits an intermediate level typically of 0.982. The other primary winding current $I_B$ has exactly the same profile as $I_A$, being displaced by 120° therefrom so that they together oppose their shoulders to create during 30° a zero level for $I_{AB} = (I_A - I_C)$ when both are equal in magnitude, while adding their highest levels during 30°, so as to double the magnitude for the same algebraical sum, as shown at 2.0. This is generally understood from a consideration of the ampere-turns of the primary and secondary windings and of the direct current Id involved during the period of conduction of each of the pairs of thyristors (Table II, first column) in the firing sequence.

The same general considerations apply to FIG. 5 relating to the 24-pulse Hexagon system according to the present invention. This particular case will be considered more specifically as follows:

According to the established operating principles of transformers having multiple secondary windings, the primary ampere-turns, generated by the current flowing in the primary winding at any given instance, cancel the algebraic sum of the secondary ampere-turns coupled with the primary. Thus, the instantaneous polarity of the primary current is the opposite of the polarity of the net secondary ampere-turns and its absolute value is the value of the net secondary ampere-turns divided by the number of turns of the primary winding. It is assumed that Np is the number of turns for each of the three primary windings (A,B,C) and that Ns is the number of turns of each of the hexagon secondary windings. The junction points to the hexagon windings are also assumed to be dividing the winding into a central number of turns N2, plus N1 turns on each side. Thus, $Ns = (N2 + 2N1)$.

By definition, the polarity of a given ampere-turn component is positive if the current in the given secondary winding segment flows in the direction of the arrow shown in FIG. 2; it is negative if it flows against the arrow.

The DC current Id enters the Hexagon (secondary) winding through a negative-going thyristor and exits through a positive-going thyristor (16 and 3, respectively, as illustrated in FIG. 2). Entering the Hexagon windings, the DC current splits into two components: one flowing clockwise, the other counterclockwise. It can be shown that the value of the resultant primary current is not affected by the ratio of these two components. It depends solely upon the instantaneous value of Id. Therefore, it is assumed hereinafter, for the sake of simplicity, that upon entering the Hexagon winding, the entire Id current flows in the clockwise direction and that no current flows from the entry to the exit point counterclockwise. Also, as illustrated, Id is assumed constant, what, typically, is the result with a steady DC load connected to the converter through a filter inductor.

Referring to FIG. 5 the development of primary winding current IA will be now considered. Starting with the first interval of conduction listed in Table II for the 24-pulse hexagon, the Id current enters the hexagon through thyristor 14 and exits through thyristor 1. Assuming a clockwise flow through the hexagon, the current will produce $(N2+N1).Id$ ampere-turns in the secondary winding A2, and $-N1.Id$ ampere-turns in the secondary winding Aq, with a total of N2.Id secondary ampere-turns which are cancelled out by $-N2.Id$ ampere-turns generated by primary winding A. This condition, lasting 15 electrical degrees, corresponds to interval (a) in FIG. 5. By the same analysis, the secondary and primary ampere-turns for all other conduction intervals can be calculated. This leads to Table IV, as follows:

TABLE IV

| | Ampere-Turns In | | |
|---|---|---|---|
| Thyristors Conducting | Secondary Winding A1 | Secondary Winding A2 | Primary Winding A |
| 1, 14 | −N1.Id | (N1 + N2).Id | −N2.Id |
| 3, 14 | −(N1 + N2).Id | (N1 + N2).Id | 0 |
| 3, 16 | −(N1 + N2).Id | N1.Id | N2.Id |
| 5, 16 | −(2N1 + N2).Id | N1.Id | (N1 + N2).Id |
| 5, 18 | −(2N1 + N2).Id | 0 | (2N1 + N2).Id |
| 7, 18 | −(2N1 + N2).Id | 0 | (2N1 + N2).Id |

TABLE IV-continued

| Thyristors Conducting | Ampere-Turns In | | |
|---|---|---|---|
| | Secondary Winding A1 | Secondary Winding A2 | Primary Winding A |
| 7, 20 | −(2N1 + N2).Id | 0 | (2N1 + N2).Id |
| 9, 20 | −(2N1 + N2).Id | 0 | (2N1 + N2).Id |
| 9, 22 | −(2N1 + N2).Id | 0 | (2N1 + N2).Id |
| 11, 22 | −(2N1 + N2).Id | 0 | (2N1 + N2).Id |
| etc. | | | |

The firing sequence is according to the second column of Table II. The ampere-turns generated by primary winding B are identical but shifted (delayed) by 120 electrical degrees. The actual values of the primary currents is determined by dividing the ampere-turns by the number of primary turns Npr. The turn-ratio of the secondary winding segments must be $N2/N1 = \sqrt{3}^-$ in order to obtain an even 30° phase shift between adjacent hexagon terminations. Thus, for the first interval in Table IV, $I_A = -(N2/Npr).Id$. FIG. 5 shows the primary current $I_A$ (dotted lines) in a normalized manner, i.e. the actual values are multiplied by the factor (Npr/Nsec).Id. This yields the primary current values for the case where: Id=1 and Npr/Nsec=1.

The current $I_B$ in primary winding B is identical with current $I_A$, except that it is phase-shifted (delayed) by 120 electrical degrees. The AC line current $I_{AB}$, flowing into the junction of windings A and B is shown in FIG. 5 in solid lines. Its normalized value is obtained for each conduction interval by calculating $I_{AB} = I_A - I_B$. Thus, the AC line current drawn by the delta windings has nine intermediate levels (as shown) existing between the maximum and minimum levels of 2.0.

Gating between positive and negative thyristors in the sequence of Table II, second column, is effected with a 15° delay, assumed on the negative side. Therefore, on each side of a peak value do exist four levels of currents of 15° duration, and there is a zero current period of 15° duration between positive and negative waveforms, whereas the peaks have, at the level 2.0, a duration of 30° by symmetry.

From Table III it appears that, with the single Hexagon and 24-pulse waveform according to the present invention, an 11×15 and a 13×15 phase shift occur for the 11th and 13th harmonics due to the 15 delay in gating for the negative group, whereby there is a reduction by sin(15° /2) = =0.1305 of these harmonics. It further indicates a 23×15 and 25×15 shifting of the 23rd and 25th harmonics, respectively, with a resulting reduction by sin(172.5° /2)=0.998. With the 24-pulse circuit suggested by the prior art, the 11th and 13th harmonics would be cancelled, although the 23rd and 25th harmonics would remain unchanged. In contrast, with the hexagon according to the invention, while the 23rd and 25th harmonics are also practically unchanged, as far as the 11th and 13th harmonics, although they may not be totally cancelled, nevertheless, they have actually been substantially reduced, namely down to 1%. This is a favorable result since it is obtained with a single transformer, and this was quite unexpected for these 11th and 13th harmonics.

Figure 7:
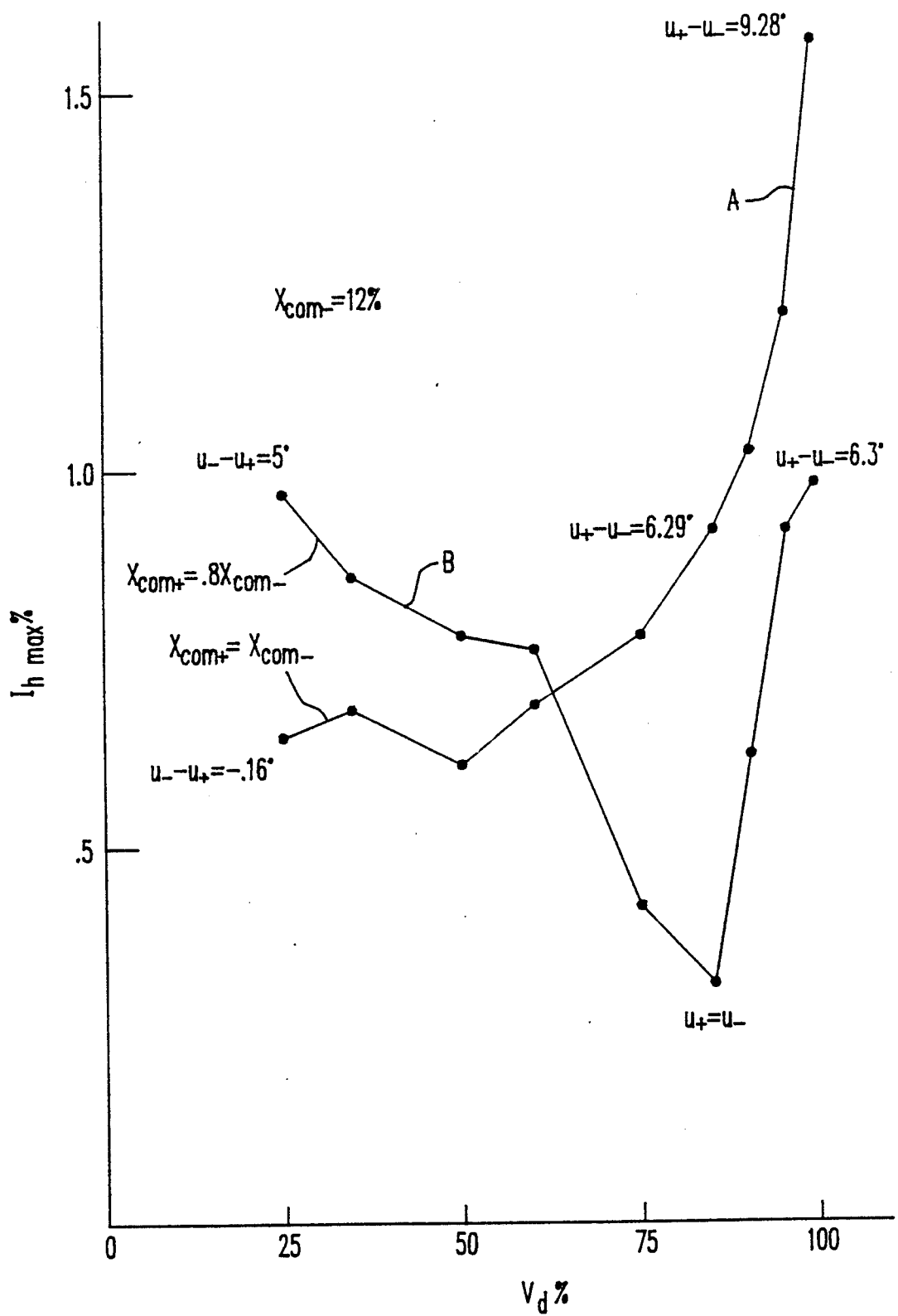
FIG. 7 provides, in the case of FIG. 6, curves showing the dominant AC line current harmonic as a function of the DC voltage at nominal DC current, one for balanced commutation inductance values, the other for unbalanced.

Moreover, the solution reached with the 11th and 13th harmonics leaves open a second step regarding the 23rd and the 25th harmonics. Thus it is proposed, according to another aspect of the present invention, to add to the 24-pulse single-transformer Hexagon-type AC/DC converter, external commutating inductances by expanding the teachings of U.S. Pat. Nos. 4,366,532 and 4,683,527 given there relative to a 12-Pulse Hexagon. The harmonic reduction is caused by the commutation overlap u which changes the rectangular sections of the AC line current waveform into trapezoid sections. With larger inductances there is more overlap and more gently sloping waveforms, thus, leading to lower harmonic contents. A side effect of the commutation overlap u is a shift in the displacement angle $\phi$ of the AC line currents by approximately half the overlap angle u. The commutation overlap follows the equation:

$$u = \arc \cos(\cos\alpha - 3.7546 X comp) - \alpha$$

where the normalized commutation reactance Xcomp is:

$$Xcomp = Id \; \omega \; Lcom / Vdnl$$

where Id is the DC output current, Lcom the inductance of the commutating path from one thyristor to the next, Vdnl the no-load DC voltage for $\alpha = 0$. firing angle. Thus, the commutation overlap angle u is a function of both the DC current and the firing angle $\alpha$. In a 12-pulse circuit this has no adverse effect. With the 24-pulse circuit according to the invention, however, the firing angle ($\alpha^-$) applied to the negative thyristor group is 15° larger than the firing angle ($a^+$) applied to the positive group. Because of this, the positive and negative group overlap angles will be different, resulting in different shifts in displacement angles. Thus, even though $\alpha^-$ is displaced by 15° with respect to $\alpha^+$, the actual displacement of the corresponding currents is less than 15°, resulting in a less than optimal reduction of the 11th and 13th harmonics. This effect also varies with $I_d$ and $\alpha$. This problem can be alleviated by decreasing the size of the commutating inductance in the positive group so as to compensate for the larger overlap angle occurring with the smaller firing angle ($\alpha^+$). This effect is illustrated in FIG. 7.

Curve (A) shows the variation of the dominant ac line current harmonic Ihmax% as a function of the dc output voltage (Vd%) adjusted by varying firing angles $\alpha^+$ and $\alpha^-$, displaced by 15°. The commutating inductances ($X_{com}$) in the positive and negative thyristor group are balanced and are 12%, i.e., the dc load current was kept constant. At each point measured, the $u^+ - u^-$ difference of the positive and negative group commutation overlaps is also shown. It can be seen that at maximum output voltage this difference is 8.28°. Thus, even though the firing angles were displaced at 15°, the actual displacement angles of the resulting currents were only 15−8.28=6.72° apart. This explains why the dominant harmonic at this point is 1.56%. A simulation run is shown in Appendix A. Curve (B) is characterized by the commutating inductances ($X_{com}$) in the positive group being reduced to 0.8×12%=9.6%. As it appears, this results in a reduction of the highest values of the ($u^+ - u^-$) difference and a corresponding reduction of the dominant harmonic below 1%. A corresponding simulation run is shown in Appendix B; thus, with unbalanced commutating inductors.

Figure 8:
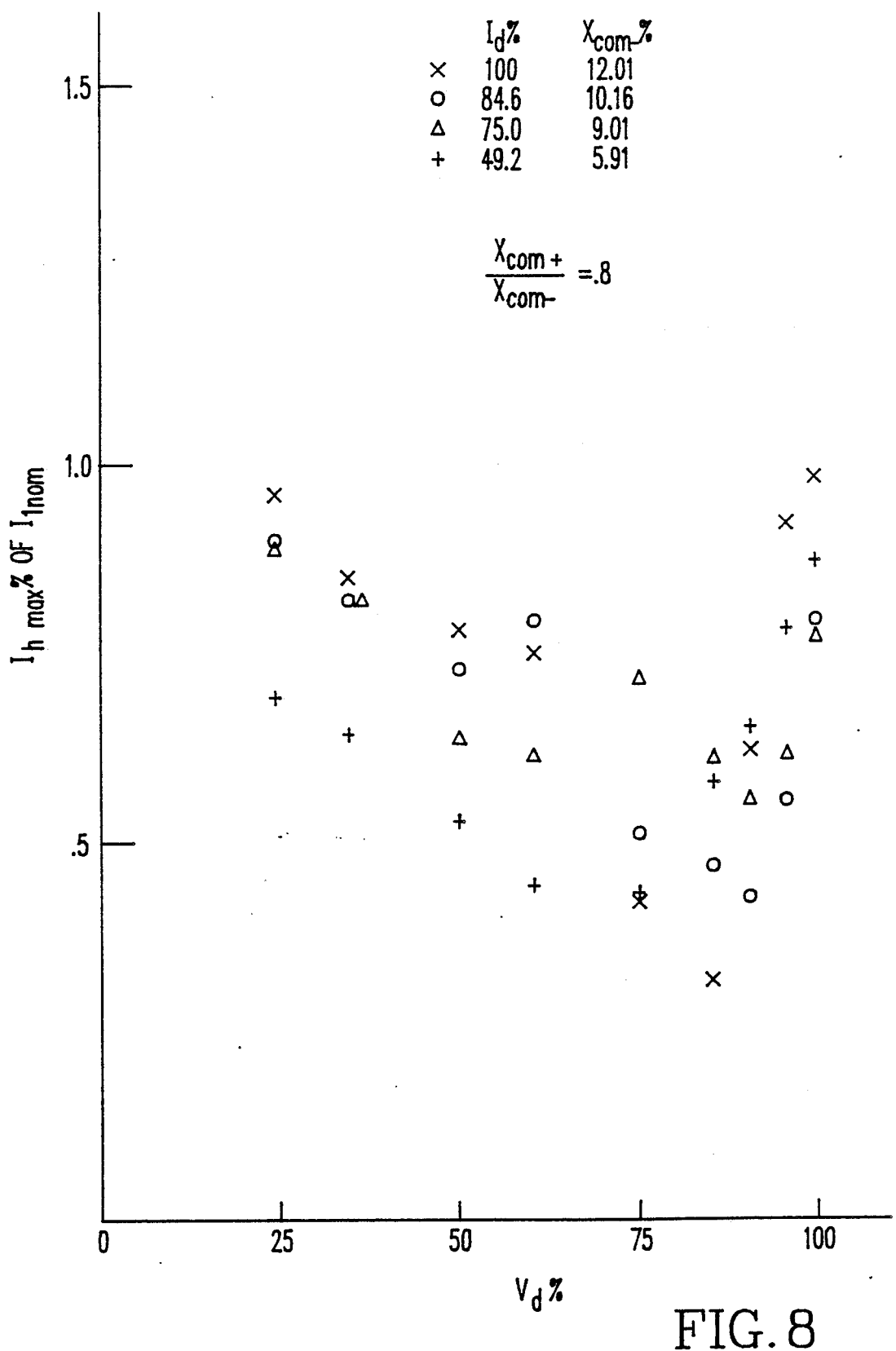
FIG. 8 is a graphic representation of the dominant AC line current harmonic as a function of the DC voltage with unbalanced communication inductance valves, at different DC current levels.

In FIG. 8 is shown, as determined by simulation, the distribution of the dominant harmonics (Ihmax% of Ih norm) for varying voltages and loads according to the following table:

| Point | Id % | $X_{com}$ % |
| --- | --- | --- |
| × | 100 | 12.01 |
| ○ | 84.6 | 10.16 |
| △ | 75.0 | 9.01 |
| + | 49.2 | 5.91 |

It can be seen there, with a commutation reactance ($X_{com}$) of 12% at maximum load and an $X_{com+}/X_{com-}=0.8$ ratio, that the dominant harmonics remain below 1% of the nominal AC line current over the entire operating range.

As was outlined above, 24-pulse operation of the Hexagon converter stipulates that both the positive-going thyristors and the negative-going thyristors be gated at 30 electrical degree intervals, with a 15 electrical degree displacement between the two groups. This amounts to alternately gating positive and negative going thyristors at 15° intervals as in any state-of-the art 24-pulse thyristor converter circuit. Thyristor gating circuits for this purpose are generally known and commercially available.

I claim:

1. A static-controlled converter including a single hexagon transformer comprising: a three-phase AC current winding and six serially connected windings defining the six sides of the hexagon, each side being connected to opposite polarity DC terminals via controlled static switches, twelve pairs of said controlled static switches being symmetrically associated with the six sides of the hexagon, two of said pairs being symmetrically disposed relative to a common side of the hexagon and each pair forming a closed-loop with the opposite polarity terminals while having a common connection with the corresponding one of said windings; and means for sequentially controlling for conduction the switches of even number in said pairs in relation to one terminal and the switches of odd number in said pairs in relation to the other terminal by rotation about opposite sides of the hexagon, the sequence of said switches being synchronous with the frequency of said three-phase current, gating of a switch in a pair lagging gating of the next switch for the adjoining pair in the sequence by a predetermined firing angle, thereby create a 24-pulse output voltage and 24-pulse AC line currents with a minimum in the AC line harmonic contents.

2. The hexagon converter of claim 1 with said lagging firing angle amounting to 15 electrical degrees.

3. The hexagon converter of claim 2 with two groups of three inductors being provided, one inductor group being interposed between said switches and a corresponding one of said DC terminals; two inductors of a group being connected to the respective first switches of a hexagon winding for the associated DC terminal polarity, and the third inductor thereof being connected to with the adjoining first switch of the adjoining hexagon winding in the switch firing sequence; thereby to reduce with two inductors the rate of change of the commutating current in two commutating switches so as to extend the duration of the attending commutation and reduce the harmonics, and said two inductors being effective with the third inductor to prevent interference by the next switch to be fired upon the commutation of said two commutating switches.

4. The hexagon converter of claim 3 with one of said two groups of three inductors having a different inductance value than the inductance value of the other, such inductance values being selected for creating a balanced commutating overlap, thereby to minimize the harmonic content of the AC line currents.

* * * * *